Aug. 9, 1932.   C. S. BROWN   1,871,150
ROLLER BEARING
Filed June 2, 1930

Charles S. Brown
INVENTOR
BY Bodell & Thompson
ATTORNEYS.

Patented Aug. 9, 1932

1,871,150

UNITED STATES PATENT OFFICE

CHARLES S. BROWN, OF SYRACUSE, NEW YORK

ROLLER BEARING

Application filed June 2, 1930. Serial No. 458,961.

This invention relates to roller bearings, and has for its object, a roller bearing which is especially economical in construction and at the same time, as efficient and durable as more costly constructions.

The invention consists in the novel features and in the combinations and constructions hereinafter set forth and claimed.

In describing this invention, reference is had to the accompanying drawing in which like characters designate corresponding parts in all the views.

Figure 1:
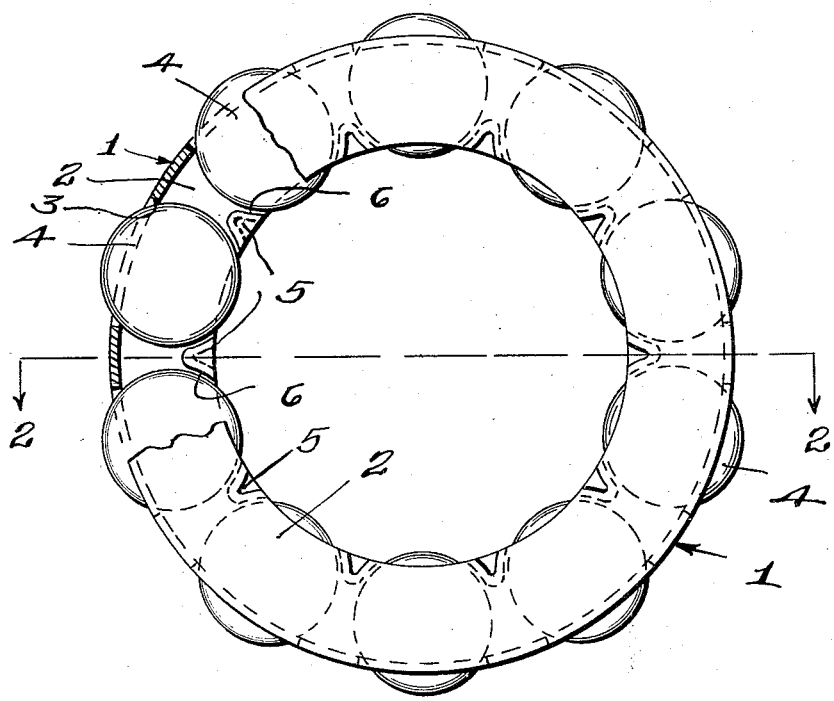
Figure 1 is a side elevation, partly broken away, of a roller bearing embodying my invention.
Figure 2:
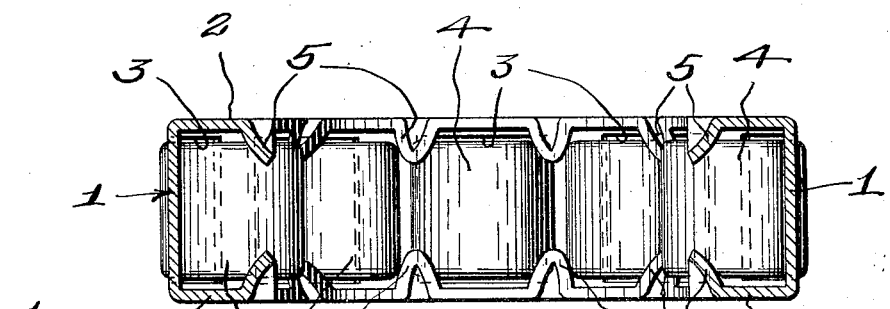
Figure 2 is a sectional view on line 2—2, Figure 1.
Figure 3:
Figure 3 is a fragmentary detail view of one of the end walls before the bosses are fully formed.

This roller bearing comprises a cage formed up in any suitable manner from sheet metal to have a peripheral cylindrical wall, and inwardly extending ends or head walls, the peripheral wall being formed with roller receiving slots, and the head walls provided with projections on their inner sides which extend between the rollers and space them apart, these projections being located so as to prevent inward displacement of the rollers out of the cage.

1 designates the peripheral or circumferential wall of the cage, and 2 the end or head walls integral with the circumferential wall. 3 are the slots through which the outer portions of the rollers 4 project.

The projections for spacing the rollers 4 and holding them from inward displacement out of the cage are struck from the end walls 2 and are bosses formed by indenting the end walls inwardly from their outer sides. 5 designates the bosses. The bosses are located at the inner margins of the head walls 2 and are spaced apart less distance than the diameter of the rollers. The slots 3 are likewise of less width than the diameter of the rollers. These bosses are also triangular in general form providing arcuate faces at 6 conforming to the peripheries of the rollers.

The tools for forming the cage and the manner of assembling rollers in the cage form no part of this invention, but usually, the cage is struck up from a sheet metal blank, or formed from a tube leaving one of the heads 2 with the bosses formed therein slightly displaced outwardly in order to permit the insertion of the rollers in the cage, and then, this displaced head is forced into its final position.

The cage may be formed from a tube, or from a sheet metal blank, and as the sheet metal blank method is more economical, it is preferably used in forming the cage. However formed, when the end flanges or heads 2 are bent inward at an angle to the cylindrical wall 1, the metal toward the free edges thereof crimps, buckles or corrugates due to surplus of stock as the outer edge is forced into a circle of less diameter. The bosses 5 are formed from such surplus metal, or the surplus metal utilized to form the bosses, or the bosses 5 take up the surplus metal at the inner edges of the head walls.

In order to gain additional bearing surface on the bosses for the rollers, or to make the faces 6 of maximum extent and extend to maximum extent under the rollers, the inner edges of the bosses are in line with the inner circle of the head walls. This is accomplished by forming the blank with arcuate projections 7 at the edges of the portions from which the bosses are projected. When the bosses are arc formed, the edges of the projections 7 come in line with the inner circle of the head wall.

The rollers 4 need not be provided with axles or recesses at their ends, and hence, can be formed by cutting them off at the proper length from a cylindrical rod.

Owing to the cage construction, and to the fact that flat ended rollers can be used, the bearing is extremely economical to manufacture, and at least is as efficient as the bearing with the usual cage construction and rollers with axles or recesses or other special means for coacting with the cages to hold them in place.

What I claim is:

1. A roller bearing construction including a cage having a peripheral wall formed with roller receiving slots and end walls extending inwardly from the peripheral wall, rollers mounted in the slots and between the end walls; and corrugations formed in the end walls and between the rollers, the depth of said corrugations increasing toward the axis of the bearing so that each corrugation overlaps the edge of a roller to hold said roller against displacement.

2. A roller bearing construction including a one-piece cage having a peripheral wall formed with roller receiving slots and end walls extending inwardly from the peripheral wall; rollers mounted in the slots and between the end walls; and corrugations formed in the end walls and between the rollers, the width and depth of said corrugations increasing toward the axis of the bearing so that each corrugation overlaps the edges of its adjacent rollers to hold said rollers in spaced relation and against displacement from the cage.

3. A roller bearing construction including a cage having a peripheral wall formed with roller receiving slots; rollers within the slots; and parallel annular end walls extending inwardly from the peripheral wall at opposite ends of the rollers, said end walls having substantially plane surfaces except for radially extending corrugations in each end wall, between each of the rollers for holding the rollers in position in the cage.

4. A roller bearing construction including a cage having a peripheral wall formed with roller receiving slots; rollers within the slots; and end walls extending inwardly from the peripheral wall at opposite ends of the rollers, said end walls being of annular form and having corrugations therein which extend from an intermediate portion of the end wall to the inside annular edge thereof, the corrugations being located between the rollers and being of such dimensions that the total length, following the corrugations, of the inside annular edge of each end wall is substantially equal to the length of the outside marginal edge of each end wall.

5. A roller bearing construction including a cage having a peripheral wall formed with roller receiving slots and end walls extending inwardly from the peripheral wall; rollers, of substantially right cylindrical form, mounted in the slots and between the end walls; and corrugations formed in the end walls and between the rollers, the depth of said corrugations increasing toward the axis of the bearing so that each corrugation overlaps the edge of a roller to hold said roller against displacement, the end walls between the corrugations being plane and parallel to the ends of the rollers.

6. A roller bearing construction including a one-piece cage having a peripheral wall formed with roller receiving slots and end walls extending inwardly from the peripheral wall; rollers of substantially right cylindrical form mounted in the slots and between the end walls; and corrugations formed in the end walls and between the rollers, the width and depth of said corrugations increasing toward the axis of the bearing so that each corrugation overlaps the edges of its adjacent rollers to hold said rollers in spaced relation and against displacement from the cage, the end walls between the corrugations being plane and parallel to the ends of the rollers.

In testimony whereof, I have hereunto signed my name, at Syracuse, in the county of Onondaga, and State of New York, this 29th day of May, 1930.

CHARLES S. BROWN.